Sept. 3, 1968 R. C. SINNOTT 3,400,386
MULTICHANNEL MAGNETIC HEAD ASSEMBLY
Filed May 27, 1964 2 Sheets-Sheet 1
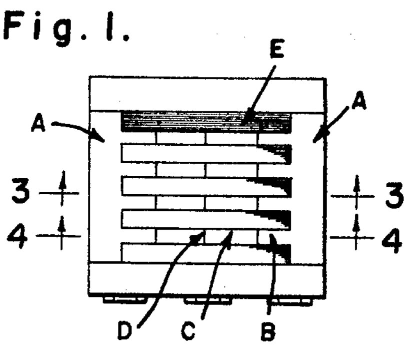
Fig. 1.
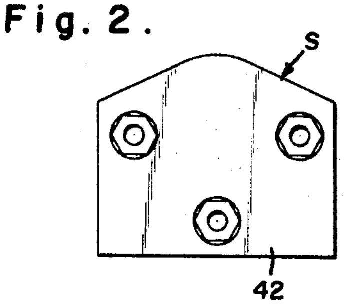
Fig. 2.
Fig. 6.
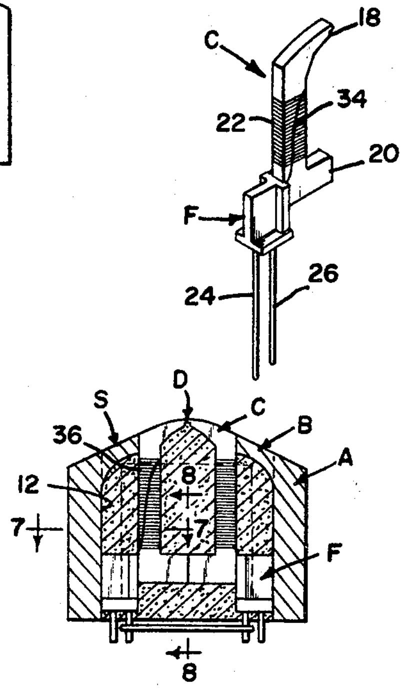
Fig. 4.
Fig. 5.
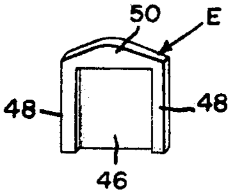
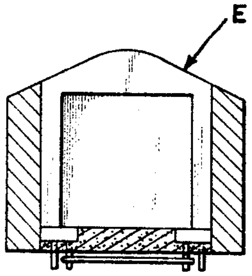
Fig. 3.
INVENTOR
Richard C. Sinnott
BY Townsend and Townsend
Attorneys

MULTICHANNEL MAGNETIC HEAD ASSEMBLY

Filed May 27, 1964 2 Sheets-Sheet 2

INVENTOR
Richard C. Sinnott
BY Townsend and Townsend
attorneys

United States Patent Office 3,400,386
Patented Sept. 3, 1968

3,400,386
MULTICHANNEL MAGNETIC HEAD ASSEMBLY
Richard C. Sinnott, Menlo Park, Calif., assignor to Magnetic Industries, Inc., Palo Alto, Calif.
Filed May 27, 1964, Ser. No. 370,566
3 Claims. (Cl. 340—174.1)

ABSTRACT OF THE DISCLOSURE

A magnetic head that is formed of subassemblies that can be tested individually. An individual pedestal for supporting each magnetic core member and electric terminals on said pedestal to form terminations for a coil that circumscribes the core member. A larger subassembly that forms one-half of a multichannel magnetic head, the subassembly being supported on a side piece that mounts plural core-pedestal subassemblies.

This invention relates to a multi-channel type head for recording and/or reproducing information onto or from traveling magnetic tape, and to a method for constructing such head.

In recording information on magnetic tape in a plurality of channels and reproducing the information so recorded, it is essential that the channels defined by narrow non-magnetic signal gaps in the heads be precisely spaced relative to one another in respect to both the longitudinal direction of tape movement and transversely thereof. Because tape heads are subject to wear and need to be replaced periodically, it is essential that tape heads be manufactured with the signal gap defining magnetic cores aligned within extremely precise tolerances to the end that uniformity of channel spacing is obtained among various heads. Another reason for requiring uniformity is that frequently information is recorded onto the tape by one head and reproduced from the tape by another head. Unless the signal gaps of both the recording head and the reproducing head are substantially identically aligned, the time relation between the information on the various channels will not be maintained which factor is extremely important in all types of magnetic recording and reproduction.

The object of the present invention in its broadest aspects is to provide at relatively low cost a magnetic head with signal gaps defined by magnetic cores aligned within extremely close tolerances. This object is achieved by providing a supporting structure having projecting surface portions on each of which surface portion a rear portion of the core is adhesively secured, the forward portion of the core being supported in precise alignment during assembly by a suitable jig or other specialized tooling. Because the jig is not incorporated into the head, the jig can be used many times as a consequence of which great care and expense may be devoted to the jig.

An aspect of the present invention that contributes to the low cost and ease of assembly of the head produced thereby is the provision of an individual terminal block or insulative pedestal for each individual core half and associated signal winding. Core half signal windings are typically formed of extremely thin wire. In known prior art devices, the signal coils are not connected to terminals until the device is in or near the final mechanical assembly stage, with the result that time consuming, intricate soldering operations are necessary to form the connections. The present invention permits each individual coil to be connected onto relatively sturdy electrical terminals immediately upon placement of a signal coil on the magnetic core. When mechanical assembly of the head is completed, the terminals are ready for connection to external circuitry. An advantage of this aspect of the invention is that individual core halves can be electrically and magnetically tested, and those not meeting specifications can be discarded at a very early stage in the assembly of the head.

The coil terminations are provided in an insulative pedestal which is adhesively secured to the core half as an initial assembly step. When the signal coil is wound upon the core half and terminated on the terminals, a subassembly is formed which lends itself to mass production techniques. Because the coil wires are terminated in a relatively uncrowded environment, the assembly procedure is materially expedited.

Another aspect of the present invention resides in a novel magnetic shield which is provided to isolate each signal gap from the other gaps for elimination of cross-talk between adjacent channels. The shield of the present invention is formed with a thin central portion bounded on three edges by a relatively thick portion. The thick edge portion provides support to the shield as well as forming a portion of the tape contacting surface. The thin central portion isolates the coils from one another yet provides sufficient clearance space for the coils.

Another object of the present invention is to provide a pair of substantially identical subassemblies which can be assembled to form a multichannel magnetic tape head. Each such subassembly includes a side piece forming a supporting structure and having a plurality of upstanding projections each of which terminates in a flat surface. The core half-coil-pedestal assemblies, referred to hereinabove, are adhesively secured to the projection surfaces in precise alignment by use of a suitable tool or jig. Upon curing of the adhesive, the jig is removed and the protruding faces of the core halves are lapped. The magnetic shield described hereinabove, is then inserted between adjacent core half pairs and affords support to the latter as well as magnetically isolating the respective gaps.

Still another object is to provide a method for assembling multichannel magnetic heads. The method includes the steps of assembling the core half, insulative spacer, and coil, and connecting the coil to electrical terminals in the pedestal as an initial procedure in constructing the head. As stated hereinabove, this method has the advantages that the connection of the coils to the terminals is effected in an uncrowded environment and a complete electrical unit, capable of being tested is formed in an early stage of the assembly process.

Yet another object is to provide a method for making a multi-channel tape head in which a side piece is provided that has extending therefrom a projection associated with each channel and a flat face is formed on each of the projections. The core half-pedestal-coil subassemblies are then adhesively secured upon the faces while simultaneously being held in alignment by a suitable jig. Because the core halves are secured upon the faces, enough of the core half is exposed for engagement by a jig. Therefore, the cost of the side pieces is materially lessened and the accuracy of the core half alignment is improved since the alignment is obtained by a reusable jig.

These and other objects, features, and advantages will be more apparent upon referring to the following specification and accompanying drawings in which:

FIGURE 1 is a top view of a multichannel head of the present invention and specifically a head having four channels;

FIGURE 2 is a side view of the head of FIGURE 1 with a convex tape surface shown by way of example;

FIGURE 3 is a view in cross-section taken along line 3—3 of FIGURE 1 and showing a magnetic shield of the present invention for isolating each channel;

FIGURE 4 is a cross-sectional view taken along line 4—4 of FIGURE 1 and showing core halves and insulative pedestals in place in a head according to the present invention;

FIGURE 5 is a perspective view at a reduced scale of a magnetic shield of the present invention;

FIGURE 6 is a perspective view of a core half-pedestal subassembly of the present invention;

Figure 7:
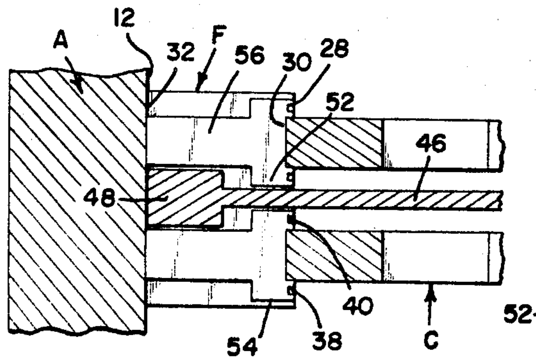
FIGURE 7 is a partial cross-section view taken substantially along line 7—7 of FIGURE 4 at an enlarged scale.

The magnetic head of the present invention includes a pair of substantially identical side pieces A for affording structural support to the remaining parts of the head. Side pieces A can be of any suitable rigid material, such as stainless steel, brass, plastic, ceramic, or the like. Each side piece has a projection B extending therefrom for association with each channel. Supported on each projection B is a core half C which has an upper face for defining a non-magnetic signal gap D on the tape contacting surface S of the head. Provided between each channel for magnetically isolating each channel from the others is a magnetic shield E. Spaced from projection B and adhesively secured to side piece A and to core half C is an insulative spacer pedestal F (see FIGURE 4).

In the preferred embodiment of the present invention, side piece A is formed with a body having a planar surface 12 from the upper edge 14 of which projections B extend. Each projection is formed with a flat face 16 which is formed in parallel spaced relation to planar surface 12. Projections B are spaced from one another by an amount approximately equal to the desired spacing between adjacent channels since each projection is associated with one channel.

Each core half C is formed in a generally U-shaped configuration to form a gap defining face 18 and a magnetic circuit completing face 20. The core halves are formed by conventional procedures of suitable magnetic material and preferably have a thickness approximately equal to the thickness of side piece projection B. Core half C has a generally rectangular body portion 22 intermediate faces 18 and 20.

Spacer pedestal F is formed of any suitable insulative material, such as molded plastic, and includes a pair of elongate substantially rigid electrical terminals 24 and 26 which are molded integral with the pedestal. Each spacer pedestal F has an inner face 28 (FIGURE 7) in which is formed a core half receiving depression 30, and an outer face 32 adapted to be adhesively secured to planar surface 12 of the side piece. The distance between the depression 30 and outer face 32 is approximately equal to the distance from face 16 to planar surface 12 of side piece A, with the result that core half C is supported in approximately parallel spaced relation to the side piece with faces 18 and 20 exposed.

Core half C is mounted to spacer pedestal F by adhesively securing a portion of the core half adjacent face 20 into depression 30. A suitable jig (not shown) can be used to align the core half and the spacer pedestal. Insulative material 34, such as fabric tape, is placed around rectangular body portion 22 of core half C and a coil 36 is wound around the insulative material in circumscribing relation to the core half. Each spacer pedestal F has a pair of grooves 38 and 40 in inner face 28, the respective grooves being formed on opposite sides of depression 30. The end wires of coil 34 are led through grooves 38 and 40, respectively, and are connected as by soldering to electrical terminals 24 and 26. Core half C, spacer pedestal F, and coil 34 constitute a channel half subassembly which can be individually electrically and magnetically tested. Core half subassemblies not meeting specifications can be discarded at this stage of the assembly of the head. Because the cost of the parts constituting the subassembly is minimal, the ability to test the subassemblies at an earlier stage in head construction and to reject those not meeting specifications contributes to the over-all low cost of a head made according to the present invention.

Figure 9:
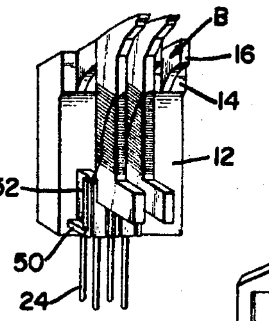
FIGURE 9 is a perspective view of a portion of a side piece subassembly of the present invention.

Referring now to FIGURE 9, the plurality of channel half assemblies are mounted onto side piece A by adhesively securing a portion of core half C adjacent face 18 to face 16 of projection B and by adhesively securing outer face 32 of pedestal F to planar surface 12 of the side piece. During such mounting, alignment of the channel half subassemblies relative to one another and to side piece A is effected by use of a suitable jig (not shown). Because core halves C rest on faces 16, rather than fitting into a slot as in prior art devices, the use of a jig in properly aligning the core halves is made possible.

The subassembly formed by side piece A and channel half subassemblies mounted thereto constitute a subassembly which is subjected to further manufacturing procedures. Faces 18 and 20 are ground and lapped into precise coplanar relationship and gap material D is placed on face 18. Silicon monoxide applied by evaporation to faces 18 has been satisfactorily used as gap material D.

Two subassemblies constructed as described next above are then fitted together with respective core half faces 18 and 20 of each subassembly in contact with one another. While the subassemblies are clamped in such position, end pieces 42 and 44 are adhesively secured to side pieces A to join the side pieces and core halves to one another. With the end pieces in place, magnetic shields E are installed.

Figure 10:
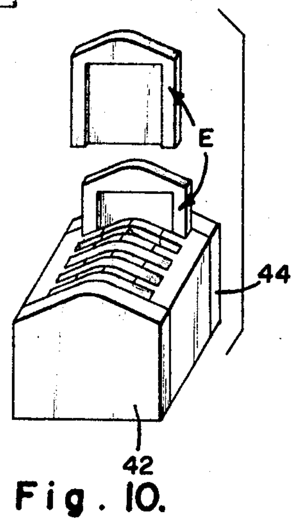
FIGURE 10 is a perspective view of a partially assembled head showing the insertion of the magnetic shields therein.

Magnetic shields E are preferably constructed of alternate laminations of magnetic material, such as Mumetal and non-magnetic electrically conductive material, such as copper, the laminations being bonded to one another in accordance with conventional techniques. The magnetic shield of the present invention is best shown in FIGURE 5 wherein the shield is seen to include a thin central portion 46 with thickened portions 48 on the sides edges thereof and thickened portion 50 on the top edge thereof. The thickness of edge portions 48 and 50 is substantially equal to the space between lateral surfaces of adjacent core halves C and the side piece projections B to which the respective core halves are bonded. Thus, as more clearly shown in FIGURE 10, the magnetic shields are adapted to be slid into each interchannel space as well as exteriorly of each end channel for magnetically isolating each gap D.

Figure 8:
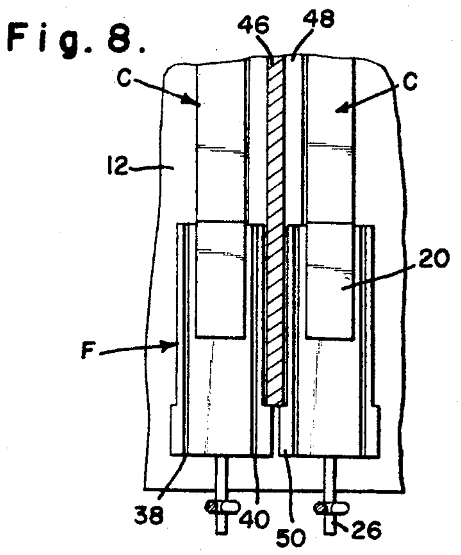
FIGURE 8 is a vertical cross-section view taken substantially along line 8—8 of FIGURE 4 at an enlarged scale.

As illustrated in FIGURES 7 and 8, adjacent pedestals F form a pocket for receiving the lower end of shield E. Each pedestal has a base 50 extending therefrom which abuts a similar base on the adjacent pedestal for spacing the pedestals relative one another. A flange 52 extends upwardly from each side of the base. Flanges 52 each have a lateral face 54; faces 54 of adjacent pedestals confront one another in spaced apart relation to define a slot for receiving thin central portion 46 of magnetic shield E. A central portion 56 of each pedestal F is narrower than flanges 52 and therefore defines, in conjunction with the flanges, a pocket for receiving thickened edge portion 48 of magnetic shield E. Thus, it is seen that pedestals F perform a plurality of functions: they define a pocket for receiving and supporting magnetic shields E, they provide an insulative support for the lower end of each core half C, and they support electrical terminals 24 and 26.

Figure 11:
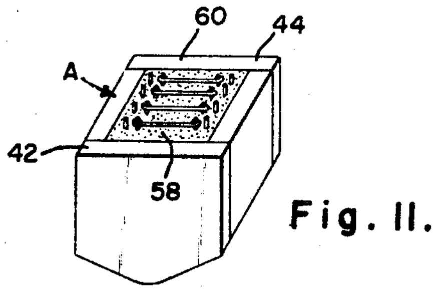
FIGURE 11 is a perspective view showing the electrical terminals of a completed magnetic head of the present invention.

Assembly of the head is completed by inverting the entire head, as shown in FIGURE 11, and filling the voids therein with a suitable material 58, such as epoxy resin. When the filler material has cured, wires 60 are installed to interconnect one terminal of the two coils of each channel. With shields E secured in place by filler material 58, the tape contacting surface S is ground and polished to the desired shape and smoothness after which a suitable head mounting device (not part of the instant invention) is installed in alignment with signal gaps D.

Thus, it is seen that a multi-channel tape head is provided in which precise alignment of the channels is attained without requiring a complex core supporting structure. Additionally, no intricate wiring operations are necessary after the final mechanical assembly of the head because the core circumscribing coils are connected to rigid electrical terminals at an initial stage during assembly of the head. Moreover, the tape contacting surface of the head is formed almost entirely by side piece projections B, core halves C, and magnetic shields E, any small spaces between the main parts being filled with resin 58.

While one embodiment of the invention has been shown and described, it will be apparent that other adaptations and modifications may be made without departing from the true spirit and scope of the invention.

What is claimed is:

1. In a multichannel magnetic tape head, a pair of substantially identical subassemblies for defining a plurality of transversely spaced signal gaps, each said subassembly comprising a plurality of generally U-shaped core halves each having a signal gap defining end and a magnetic circuit completing end, an insulative pedestal adhesively and immovably secured to each said core half, each said pedestal having a pair of electrical terminals formed therein, a coil circumscribing each said core half intermediate the ends thereof, said coil being terminated on the electrical terminals of the pedestal that is secured to the core half circumscribed by the coil, a side piece having a planar surface and a plurality of spaced apart aligned projections extending from said surface, said projections terminating in faces spaced from said side piece surface, said core halves being adhesively secured to said projection faces adjacent to the gap defining end of said core half and said pedestal being adhesively secured to said side piece surface.

2. A magnetic tape head comprising a rigid housing, a plurality of pairs of core halves for defining a plurality of transversely spaced signal gaps, an insulative spacer pedestal associated with each said core half, said pedestal being adhesively secured to said housing and to the core half associated therewith, each said spacer pedestal being formed with a base for defining lateral faces for spacing adjacent core halves from one another and flanges extending from the bases adapted to define mutually confronting spaced apart faces, and a shield for magnetically isolating said core half pairs from one another, said shield being mounted between said mutually confronting pedestal faces and having a central relatively thin portion for defining a clearance space proximate said core halves, and a wire signal coil wound on each said core half within said clearance space.

3. The invention of claim 2 including a pair of electric terminals formed in said insulative spacer pedestal and means for connecting opposite ends of said signal coil to respective said terminals.

References Cited

UNITED STATES PATENTS

| | | | |
|---|---|---|---|
| 3,319,238 | 5/1967 | Jacoby | 346—74 |
| 3,064,333 | 11/1962 | Kristiansen et al. | 179—100.2 |
| 3,921,143 | 1/1960 | Selsted et al. | 179—100.2 |
| 2,908,770 | 10/1959 | Warren | 179—100.2 |

BERNARD KONICK, *Primary Examiner.*

A. I. NEUSTADT, *Assistant Examiner.*